United States Patent
Anderson et al.

(10) Patent No.: US 8,943,650 B2
(45) Date of Patent: Feb. 3, 2015

(54) HINGE ASSEMBLY FOR VEHICLE INTERIOR TRIM COMPONENT

(75) Inventors: Rick A. Anderson, Grand Haven, MI (US); Loren R. Washburn, Hamilton, MI (US); Allan W. Getliff, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/698,500

(22) PCT Filed: May 20, 2011

(86) PCT No.: PCT/US2011/037422
§ 371 (c)(1),
(2), (4) Date: Jan. 22, 2013

(87) PCT Pub. No.: WO2011/146887
PCT Pub. Date: Nov. 24, 2011

(65) Prior Publication Data
US 2013/0111706 A1    May 9, 2013

Related U.S. Application Data

(60) Provisional application No. 61/347,099, filed on May 21, 2010.

(51) Int. Cl.
*E05D 11/08* (2006.01)
*E05D 11/10* (2006.01)
(Continued)

(52) U.S. Cl.
CPC ............ *E05D 11/082* (2013.01); *B60N 2/4686* (2013.01); *E05D 11/087* (2013.01); *E05D 11/1085* (2013.01); *E05Y 2201/638* (2013.01); *E05Y 2900/538* (2013.01); *E05D 3/02* (2013.01)
USPC ................................................ 16/342; 16/330

(58) Field of Classification Search
USPC ........... 16/330, 327, 337, 338, 339, 340, 342; 296/24.34, 1.09; 297/411.32, 411.38
See application file for complete search history.

(56) References Cited

U.S. PATENT DOCUMENTS 3,890,672 A * 6/1975 Berthagen ........................ 16/340
4,590,642 A * 5/1986 Hesener .......................... 16/241
(Continued)

FOREIGN PATENT DOCUMENTS

DE        10223460 A1 * 12/2003
JP        2000-249133    9/2000
(Continued)

OTHER PUBLICATIONS

PCT/US2011/037422 International Search Report and Written Opinion mailed Sep. 29, 2011.
(Continued)

*Primary Examiner* — Victor Batson
*Assistant Examiner* — Jason W San
(74) *Attorney, Agent, or Firm* — Fletcher Yoder, P.C.

(57) ABSTRACT

A vehicle interior trim component hinge assembly includes a rotatable component, and a shaft disposed through the rotatable component. The hinge assembly also includes a first friction disk rotationally coupled to the shaft, and a second friction disk rotationally coupled to the rotatable component. The hinge assembly further includes a biasing member configured to urge the first and second friction disks toward one another to establish a friction force that provides resistance to rotation of the rotatable component about the shaft.

15 Claims, 9 Drawing Sheets

(51) Int. Cl.
  *B60N 2/46* (2006.01)
  *E05D 3/02* (2006.01)

(56) References Cited

U.S. PATENT DOCUMENTS

| | | | | |
|---|---|---|---|---|
| 5,109,570 | A * | 5/1992 | Okada et al. | 16/289 |
| 5,165,145 | A * | 11/1992 | Sherman | 16/341 |
| 6,033,015 | A | 3/2000 | Husted | |
| 6,421,878 | B1 * | 7/2002 | Kaneko et al. | 16/330 |
| 6,467,129 | B1 * | 10/2002 | Bae | 16/342 |
| 6,988,294 | B2 * | 1/2006 | Birtley | 16/342 |
| 7,143,476 | B2 * | 12/2006 | Minami | 16/340 |
| 8,042,230 | B2 * | 10/2011 | Wang | 16/340 |
| 8,046,875 | B2 * | 11/2011 | Wang et al. | 16/338 |
| 8,245,356 | B2 * | 8/2012 | Chu et al. | 16/342 |
| 8,261,411 | B2 * | 9/2012 | Shen | 16/340 |
| 8,261,412 | B1 * | 9/2012 | Lin | 16/340 |
| 8,266,766 | B2 * | 9/2012 | Huang et al. | 16/330 |
| 8,432,677 | B2 * | 4/2013 | Duan et al. | 361/679.27 |
| 2004/0074050 | A1 * | 4/2004 | Birtley | 16/340 |
| 2004/0134031 | A1 | 7/2004 | Nishihara | |
| 2006/0048337 | A1 | 3/2006 | Lowry et al. | |
| 2009/0158556 | A1 * | 6/2009 | Chang et al. | 16/330 |
| 2011/0242745 | A1 * | 10/2011 | Kono | 361/679.01 |
| 2012/0102677 | A1 * | 5/2012 | Koarai et al. | 16/337 |
| 2013/0111706 | A1 * | 5/2013 | Anderson et al. | 16/342 |

FOREIGN PATENT DOCUMENTS

| | | |
|---|---|---|
| JP | 2001-336523 | 12/2001 |
| JP | 2002-070832 | 3/2002 |
| JP | 2002-333008 | 11/2002 |
| JP | 2004-204983 | 7/2004 |
| KR | 187175 | 4/1999 |

OTHER PUBLICATIONS

Japanese Office Action dated Nov. 26, 2013.
Korean Office Action dated Apr. 11, 2014.
Chinese Office Action dated Jun. 4, 2014.
Japanese Office Action dated Jun. 30, 2014.
European Patent Office Communication Pursuant to Article 94(3) EPC dated Nov. 20, 2014.

* cited by examiner

HINGE ASSEMBLY FOR VEHICLE INTERIOR TRIM COMPONENT

CROSS REFERENCE TO RELATED APPLICATION

This application claims priority from and the benefit of U.S. Provisional Application Ser. No. 61/347,099, entitled "HINGE ASSEMBLY FOR VEHICLE INTERIOR TRIM COMPONENT", filed May 21, 2010, which is hereby incorporated by reference in its entirety.

BACKGROUND

The invention relates generally to a hinge assembly for a vehicle interior trim component.

Many vehicles have a central floor console located between the driver seat and the front passenger seat. In most cases, the floor console extends from below the front dash toward the second row of seating and may include an armrest for the driver and/or front passenger. These floor consoles have been used in vehicles for many years and can vary quite significantly, depending on the type and make of the vehicle. However, a common aspect of many of these floor consoles is the inclusion of a designed storage space.

Certain floor console armrests are configured to rotate about a lateral axis of the vehicle interior to expose a storage compartment underneath the armrest. For example, an occupant may rotate the armrest upwardly to access items within the storage compartment. In certain configurations, a hinge assembly facilitates rotation of the armrest with respect to the floor console while providing resistance to rotation. Certain hinge assemblies include a steel shaft with spring clips disposed about the shaft. Friction between the spring clips and the shaft establishes a desired resistance to armrest rotation. Unfortunately, because the shaft and spring clips are machined from steel, such hinge assemblies are expensive to manufacture. In addition, the steel elements may increase vehicle weight, thereby reducing fuel efficiency. Furthermore, adjusting the hinge assembly to achieve a desired level of resistance may be a complex and time-consuming process, thereby further increasing manufacturing costs.

BRIEF DESCRIPTION OF THE INVENTION

The present invention relates to a vehicle interior trim component hinge assembly including a shaft rigidly coupled to a first structure, and a passage within a second structure. The shaft passes through the passage to facilitate rotation of the second structure relative to the first structure. The hinge assembly also includes a first friction disk disposed about the shaft and including a first engagement feature configured to block rotation of the first friction disk relative to the shaft. The hinge assembly further includes a second friction disk disposed about the shaft and including a second engagement feature configured to block rotation of the second friction disk relative to the passage. In addition, the hinge assembly includes a biasing member configured to urge the first and second friction disks toward one another to establish a friction force that provides rotational resistance between the first and second structures.

The present invention also relates to a vehicle interior trim component hinge assembly including a rotatable component, and a shaft disposed through the rotatable component. The hinge assembly also includes a first friction disk rotationally coupled to the shaft, and a second friction disk rotationally coupled to the rotatable component. The hinge assembly further includes a biasing member configured to urge the first and second friction disks toward one another to establish a friction force that provides resistance to rotation of the rotatable component about the shaft.

The present invention further relates to a method of manufacturing a vehicle interior trim component hinge assembly including forming a torsion assembly by rotationally coupling a first friction disk to a shaft, disposing a second friction disk about the shaft adjacent to the first friction disk, and biasing the first and second friction disks toward one another to establish a friction force. The method also includes disposing the torsion assembly within a passage of a rotatable component such that an outer protrusion of the second friction disk engages a recess of the rotatable component to rotationally couple the second friction disk to the rotatable component. The friction force provides resistance to rotation of the rotatable component about the shaft.

DRAWINGS

DETAILED DESCRIPTION

Figure 1:
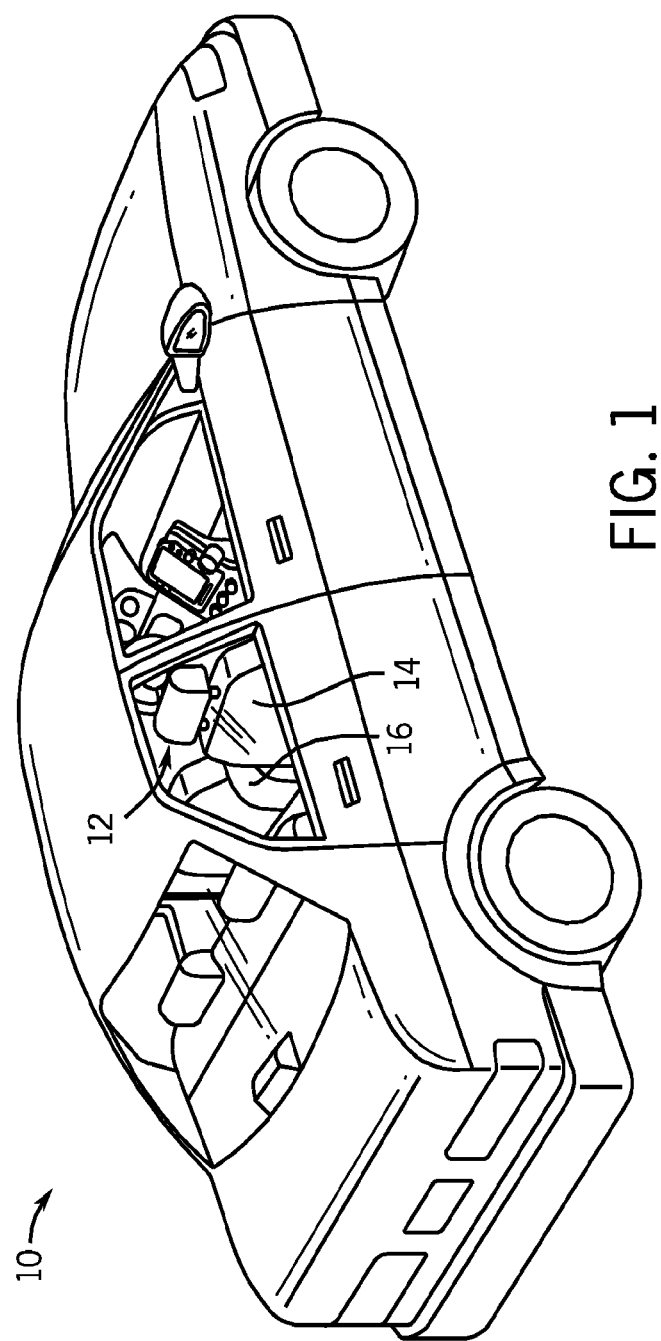
FIG. 1 is a perspective view of an exemplary vehicle that may include a hinge assembly configured to provide resistance to rotation.

FIG. 1 is a perspective view of a motor vehicle 10 including a floor console having a rotatable armrest. As illustrated, the vehicle 10 includes an interior 12 having a seat 14, and a floor console 16. As discussed in detail below, the floor console 16 includes an armrest having a hinge assembly configured to provide resistance to armrest rotation. In certain embodiments, the hinge assembly includes a shaft rigidly coupled to an armrest base, and a passage within an armrest lid. The shaft passes through the passage to facilitate rotation of the armrest lid relative to the armrest base. The hinge assembly also includes a first friction disk disposed about the shaft and including a first engagement feature configured to block rotation of the first friction disk relative to the shaft. Furthermore, the hinge assembly includes a second friction disk disposed about the shaft and including a second engagement feature configured to block rotation of the second friction disk relative to the passage. The hinge assembly also includes a biasing member configured to urge the first and second friction disks toward one another to establish a friction force that provides rotational resistance between the armrest lid and the armrest base. In such a configuration, rotation of the armrest in either an upward or downward direction is resisted by the friction force between disks.

Rotational resistance may be varied by adjusting the friction force between disks. For example, the number of first and second friction disks may be selected to achieve a desired level of rotational resistance. In addition, the biasing force, the radius of the first and second friction disks and/or the disk material may be chosen to attain a friction force sufficient to establish a desired rotational resistance. Because the shaft and friction disks may be constructed from light-weight plastic, the present hinge assembly may be lighter and less expensive to produce than hinge assemblies employing steel shafts and spring clips. While the hinge assembly is described below with reference to an armrest, it should be appreciated that the hinge assembly may be employed within other areas of the vehicle interior 12. For example, an overhead console, a glove compartment and/or other storage areas may include a door configured to rotate about a similar hinge assembly. In addition, the hinge assembly may be utilized to facilitate rotation of a sun visor or other vehicle interior component. It should also be appreciated that the hinge assembly described below may be employed within other devices or machines unrelated to vehicle interiors 12.

Figure 2:
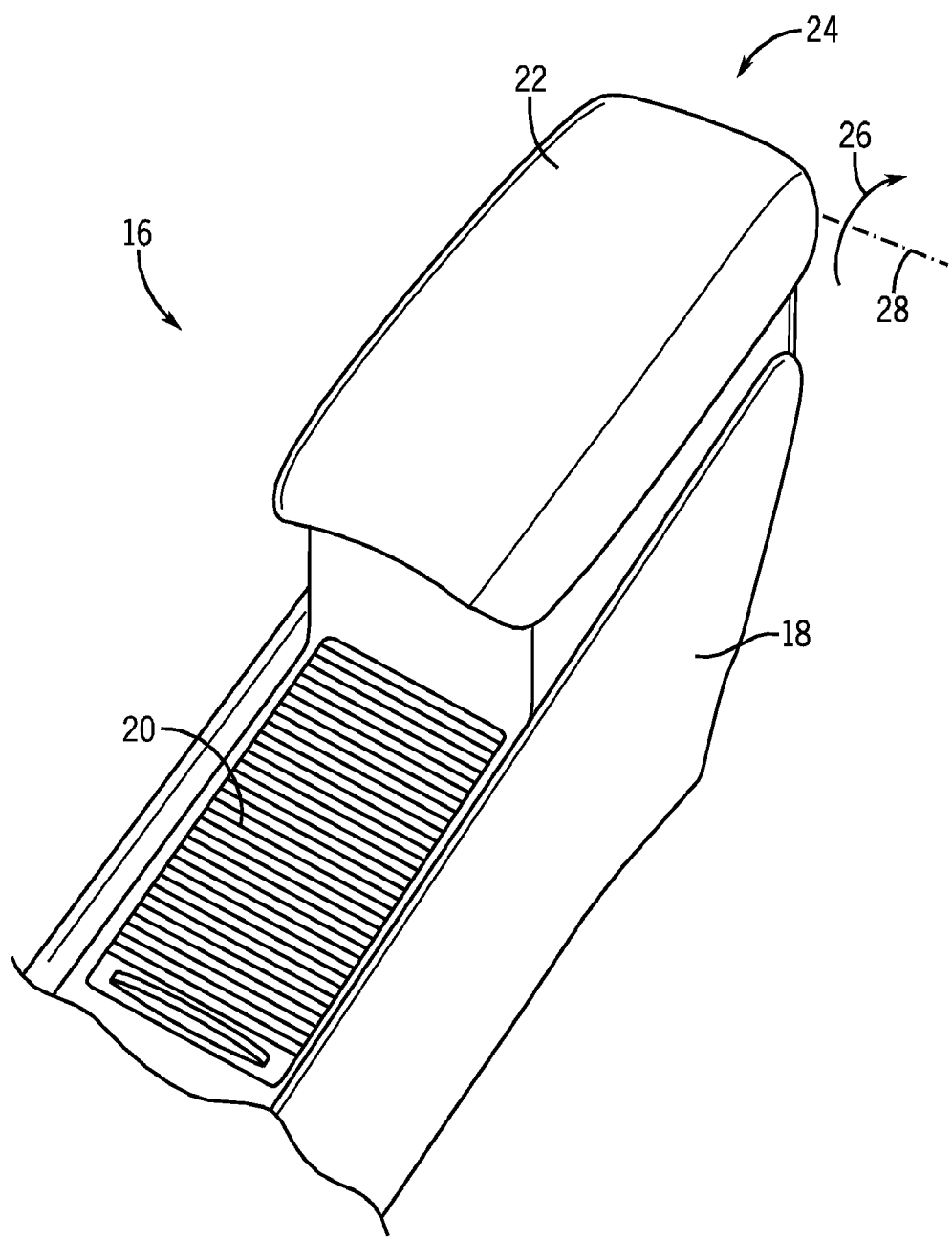
FIG. 2 is a perspective view of an exemplary floor console, as shown in FIG. 1, having an armrest with a hinge assembly configured to provide resistance to armrest rotation.

FIG. 2 is a perspective view of an exemplary floor console 16, as shown in FIG. 1, having an armrest with a hinge assembly configured to provide resistance to armrest rotation. As illustrated, the floor console 16 includes a body 18 enclosing one or more storage compartments. For example, the floor console 16 may include a storage compartment underneath the illustrated tambour door 20 and/or the armrest 22. As will be appreciated, the tambour door 20 may be configured to transition between the illustrated closed position to an open position that facilitates access to a storage compartment positioned at a front portion of the console 16. Similarly, as discussed in detail below, the armrest 22 may rotate to expose another storage compartment positioned at a rear portion of the console 16. In certain configurations, the two storage compartments may be connected such that an occupant may access either storage compartment via the tambour door 20 or the armrest 22. It should be appreciated that alternative embodiments may include additional storage compartments positioned throughout the floor console 16.

As discussed in detail below, the armrest 22 includes a hinge assembly 24 configured to facilitate rotation of the armrest 22. In certain embodiments, the armrest 22 is configured to rotate upwardly in a direction 26 about a lateral axis 28 (e.g., an axis extending laterally along the vehicle interior 12). In such embodiments, rotation of the armrest 22 may expose an interior of a storage compartment disposed within the body 18. In the present embodiment, the hinge assembly 24 includes multiple friction disks configured to provide resistance to armrest rotation about the hinge assembly 24. Specifically, the hinge assembly 24 includes a shaft disposed through the armrest 22, and a first friction disk rotationally coupled to the shaft. The hinge assembly 24 also includes a second friction disk rotationally coupled to the armrest 22, and a biasing member configured to urge the first and second friction disks toward one another to establish a friction force that provides resistance to rotation of the armrest 22 about the shaft. Because the shaft and friction disks may be composed of light-weight plastic, the hinge assembly 24 may be lighter and less expensive to produce than hinge assemblies including metal shafts and spring clips.

Figure 3:
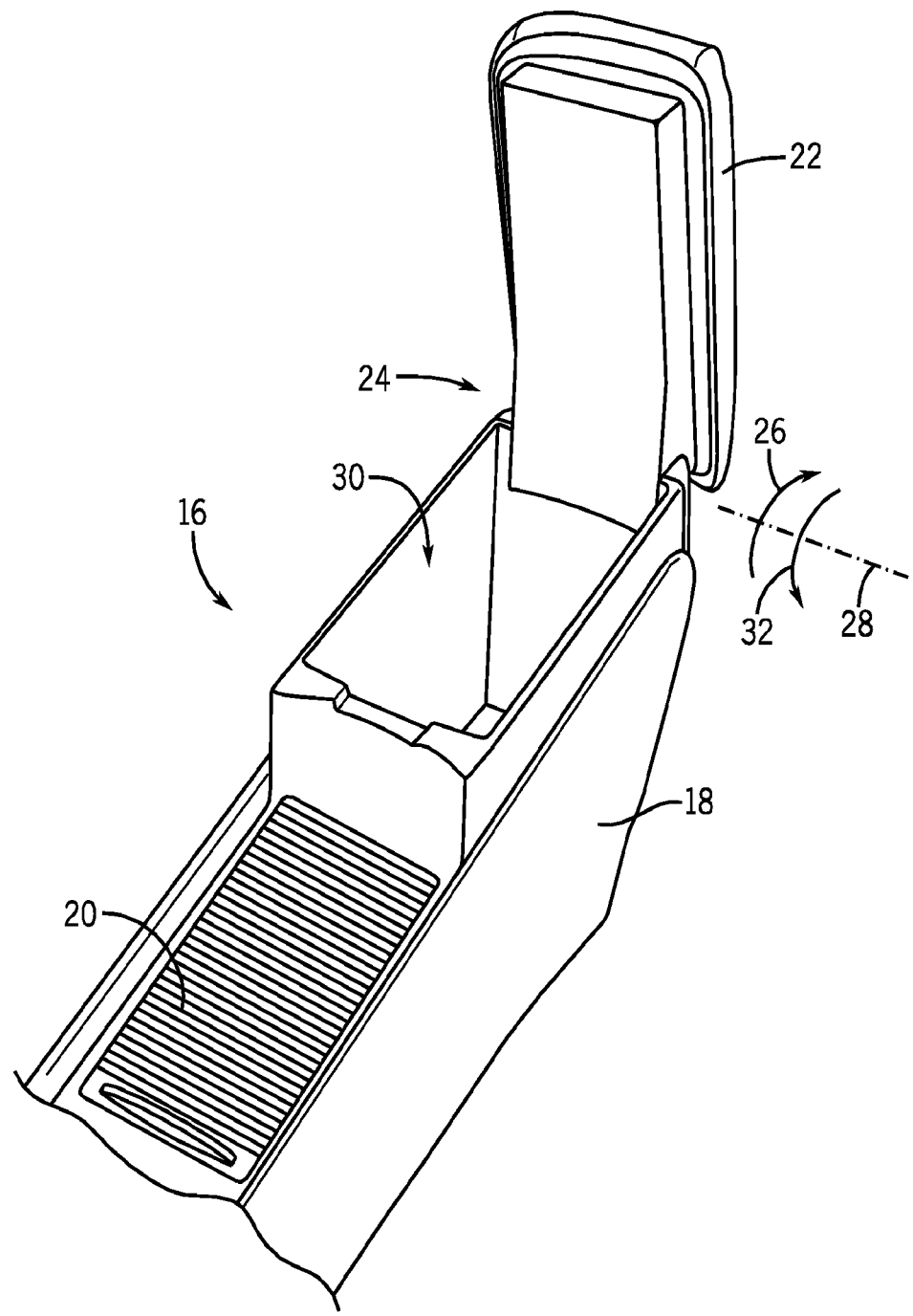
FIG. 3 is a perspective view of the floor console shown in FIG. 2, in which the armrest is rotated about an axis to expose a storage compartment within the floor console.

FIG. 3 is a perspective view of the floor console 16 shown in FIG. 2, in which the armrest 22 is rotated about the lateral axis 28 to expose a storage compartment 30 within the body 18 of the floor console 16. With the storage compartment open, the occupant may access items within the storage compartment 30 and/or place additional items within the compartment 30. As previously discussed, the storage compartment 30 may be linked to another storage compartment disposed beneath the tambour door 20 to enhance utility of the center console 16. The storage compartment 30 may be closed by rotating the armrest 22 downwardly in the direction 32.

Figure 4:
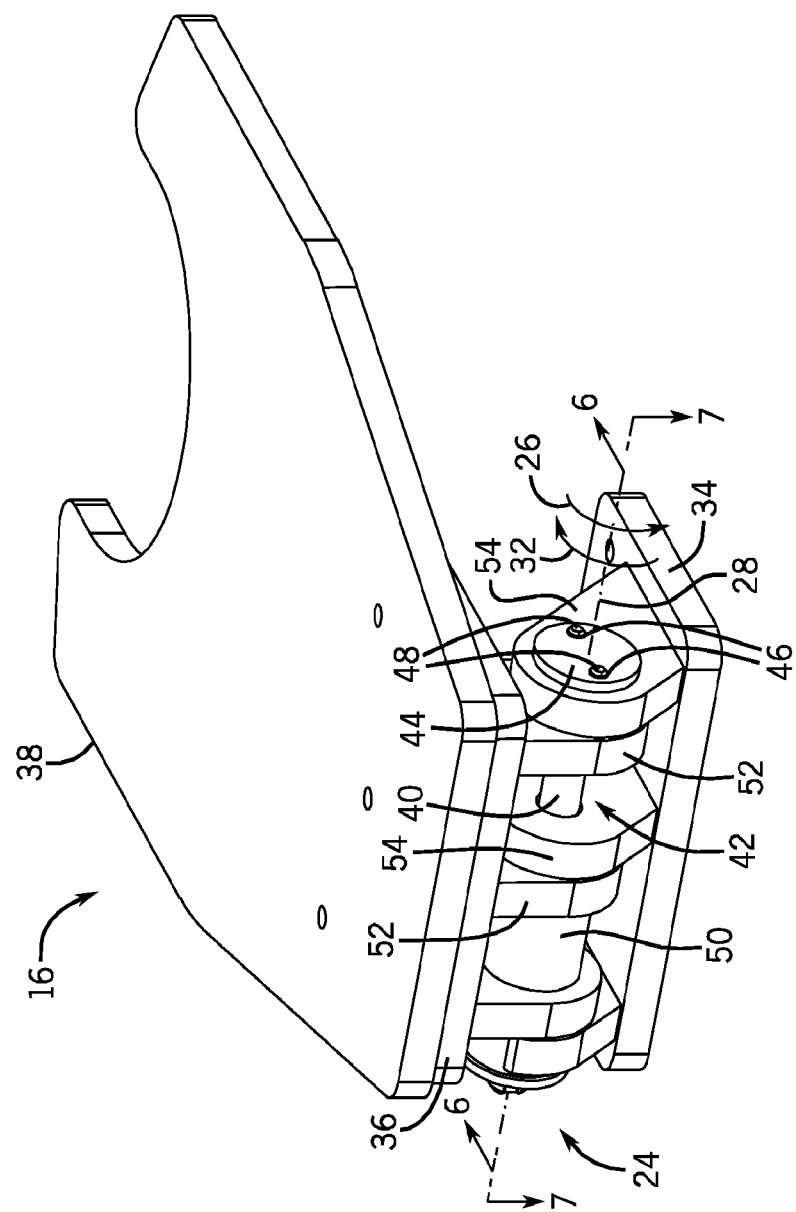
FIG. 4 is a perspective view of a hinge assembly that may be employed within the floor console of FIG. 2 to facilitate rotation of the armrest.

FIG. 4 is a perspective view of a hinge assembly 24 that may be employed within the floor console of FIG. 2 to facilitate rotation of the armrest 22. As illustrated, the hinge assembly 24 includes a first structure, such as the illustrated armrest base 34, and a second structure, such as the illustrated armrest lid 36. In the present embodiment, an armrest profile 38 is coupled to the armrest lid 36, and configured to support components of the armrest 22, such as foam padding and/or an outer skin covering. As discussed in detail below, the hinge assembly 24 facilitates rotation of the armrest lid 36 relative to the armrest base 34 to enable the armrest 22 to rotate in the directions 26 and 32, as illustrated in FIGS. 2 and 3.

As illustrated, a shaft 40 extends through elements of the armrest base 34 and armrest lid 36 to facilitate rotation of the armrest 22. In the illustrated embodiment, the shaft 40 is a component of a pin 42. The pin 42 also includes a head 44 disposed at one end of the shaft 40. The head 44 is keyed to the armrest base 34 to block rotation of the shaft 40 relative to the base 34. Specifically, the head 44 includes two openings 46 configured to interface with two corresponding protrusions 48 of the base 34. Because an outer diameter of each protrusion 48 is substantially similar to an inner diameter of each opening 46, contact between the protrusions 48 and the openings 46 substantially blocks rotation of the pin 42 relative to the armrest base 34. While two protrusions 48 and two openings 46 are utilized in the illustrated configuration, it should be appreciated that more or fewer protrusions 48 and openings 46 may be employed in alternative embodiments. In addition, further embodiments may incorporate alternative key assemblies to block rotation of the pin 42 relative to the base 34.

As illustrated, the shaft 40 of the pin 42 extends through a passage, such as the illustrated cavity 50, of the armrest lid 36. As discussed in detail below, the cavity 50 includes certain unique features configured to facilitate rotation of the armrest lid 36 about the shaft 40 while providing a resistance to rotational movement. The shaft 40 also extends through supports 52 coupled to the armrest lid 36 and supports 54 coupled to the armrest base 34. The shaft 40 and supports 52 and 54 serve to couple the armrest lid 36 to the armrest base 34, while enabling rotation of the armrest 22.

Figure 5:
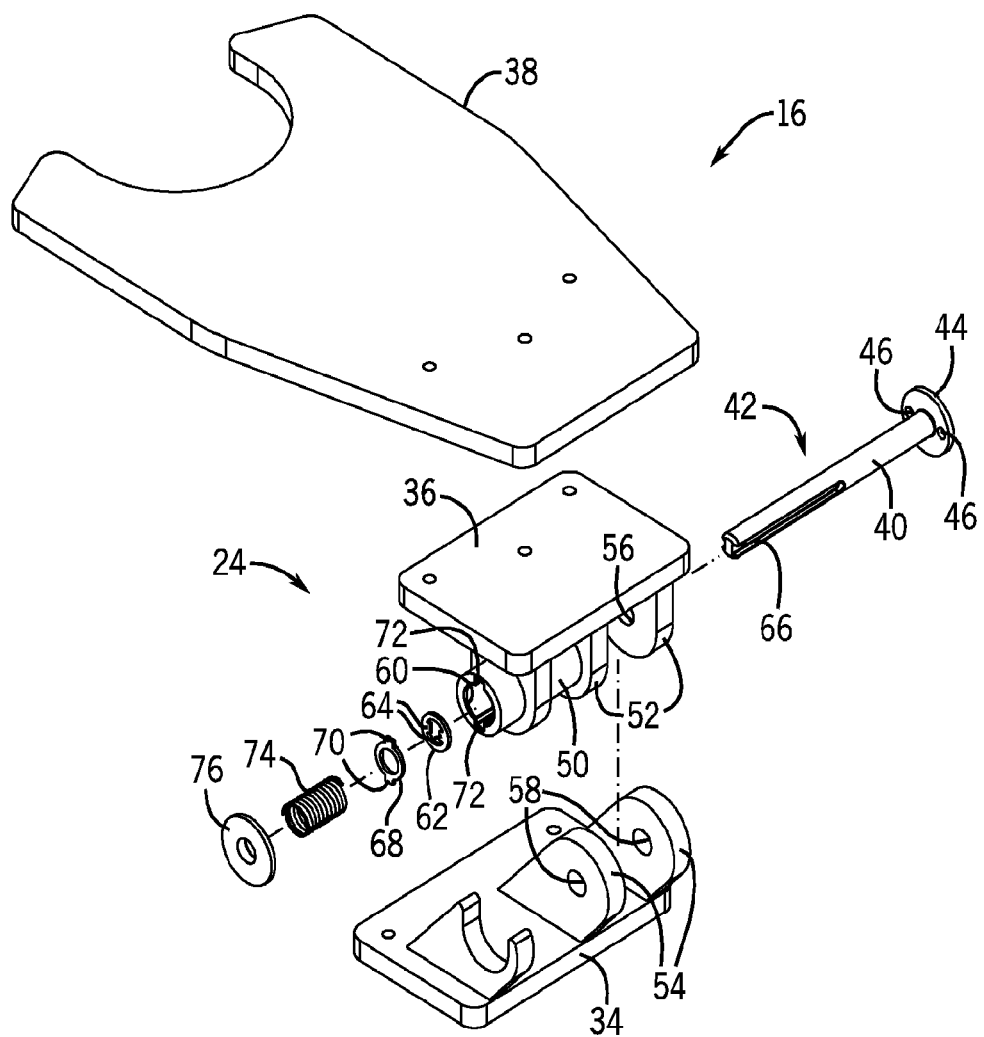
FIG. 5 is an exploded view of the hinge assembly, as shown in FIG. 4.

FIG. 5 is an exploded view of the hinge assembly 24, as shown in FIG. 4. As illustrated, each support 52 coupled to the armrest lid 36 includes an opening 56 configured to receive the shaft 40. Similarly, each support 54 coupled to the armrest base 34 includes an opening 58 configured to receive the shaft 40. Consequently, once the openings 56 and 58 are aligned, the shaft 40 of the pin 42 may be inserted though the supports 52 and 54, thereby coupling the armrest lid 36 to the armrest base 34 and enabling rotation of the armrest lid 36 relative to the base 34. In addition, once the pin 42 is inserted, the shaft 40 will extend into an interior 60 of the cavity 50. As discussed in detail below, the cavity 50 includes certain features configured to provide resistance to rotation of the armrest lid 36 about the shaft 40.

In the present embodiment, the cavity 50 contains friction disks configured to establish a friction force that provides resistance to rotation of the armrest lid 36. As illustrated, the armrest assembly 24 includes a first friction disk 62 disposed about a portion of the shaft 40 positioned within the cavity 50. The first friction disk 62 includes a first engagement feature configured to block rotation of the first friction disk 62 relative to the shaft 40. Specifically, the first friction disk 62 includes two inner protrusions 64 configured to engage two corresponding recesses 66 within the shaft 40. As will be appreciated, contact between the protrusions 64 and the recesses 66 will block rotation of the first friction disk 62 about the shaft 40. Consequently, an orientation of the first friction disk 62 will be fixed relative to the armrest base 34. While the illustrated first friction disk 62 includes two protrusions 64, it should be appreciated that alternative embodiments may include more or fewer protrusions 64. For example, certain embodiments may include 1, 2, 3, 4, 5, 6, or more protrusions 64 and a corresponding number of recesses 66 within the shaft 40.

The armrest assembly 24 also includes a second friction disk 68 disposed about the portion of the shaft 40 positioned within the cavity 50. The second friction disk 68 includes a second engagement feature configured to block rotation of the second friction disk 68 relative to the cavity 50. Specifically, the second friction disk 68 includes two outer protrusions 70 configured to engage two corresponding recesses 72 within the interior 60 of the cavity 50. As will be appreciated, contact between the protrusions 70 and the recesses 72 will block rotation of the second friction disk 68 within the cavity 50. Consequently, an orientation of the second friction disk 68 will be fixed relative to the armrest lid 36. While the illustrated second friction disk 68 includes two protrusions 70, it should be appreciated that alternative embodiments may include more or fewer protrusions 70. For example, certain embodiments may include 1, 2, 3, 4, 5, 6, or more protrusions 70 and a corresponding number of recesses 72 within the cavity 50.

The hinge assembly 24 also includes a biasing member, such as the illustrated coil spring 74. In the present embodiment, the spring 74 is disposed about the shaft 40 and configured to apply a compression force to the second friction disk 68. As discussed in detail below, an end cap 76 is positioned adjacent to the opening of the cavity 50 and secured to the shaft 40. Consequently, the spring 74 pushes outwardly against the end cap 76 and the second friction disk 68, thereby urging the second friction disk 68 against the first friction disk 62. As a result, a friction force is established between disks 62 and 68 which provides resistance to rotation of the armrest lid 36. Specifically, because the first friction disk 62 is rotationally coupled to the shaft 40 and the second friction disk 68 is rotationally coupled to the armrest lid 36, rotation of the armrest lid 36 about the shaft 40 is resisted by friction between the disks 62 and 68 resulting from the axial force applied by the spring 74.

The magnitude of rotational resistance may be varied by adjusting certain parameters within the hinge assembly 24. For example, adjusting the coefficient of friction on the surface of each disk 62 and 68 will affect the friction force between disks, thereby resulting in increased or decreased rotational resistance. As will be appreciated, the coefficient of friction may be adjusted by varying the disk material and/or altering a surface finish of the disks 62 and 68. In addition, adjusting the diameter of the disks 62 and 68 will alter the contact area between disks, thereby varying the friction force. Furthermore, the force applied by the spring 74 may be increased to achieve a higher rotational resistance, or decreased to lower rotational resistance. As discussed in detail below, the number of first and second friction disks 62 and 68 employed within the hinge assembly 24 will also affect rotational resistance.

In certain embodiments, the number of disks 62 and 68, the spring force, the diameter of the disks 62 and 68 and/or the coefficient of friction between disks 62 and 68 may be selected during the manufacturing process to achieve a desired level of rotational resistance. For example, if a first rotational resistance is desired for a first armrest 22, and a second rotational resistance is desired for a second armrest 22, a different number of disks 62 and 68 may be employed within each hinge assembly 24. Otherwise, the hinge assemblies 24 may be substantially identical. Such a configuration may significantly reduce manufacturing costs by enabling a single hinge assembly 24 to provide varying degrees of rotational resistance. In addition, the pin 42 and/or the disks 62 and 68 may be composed of plastic, thereby providing a lighter and less expensive hinge assembly than configurations utilizing metal shafts and spring clips.

Figure 6:
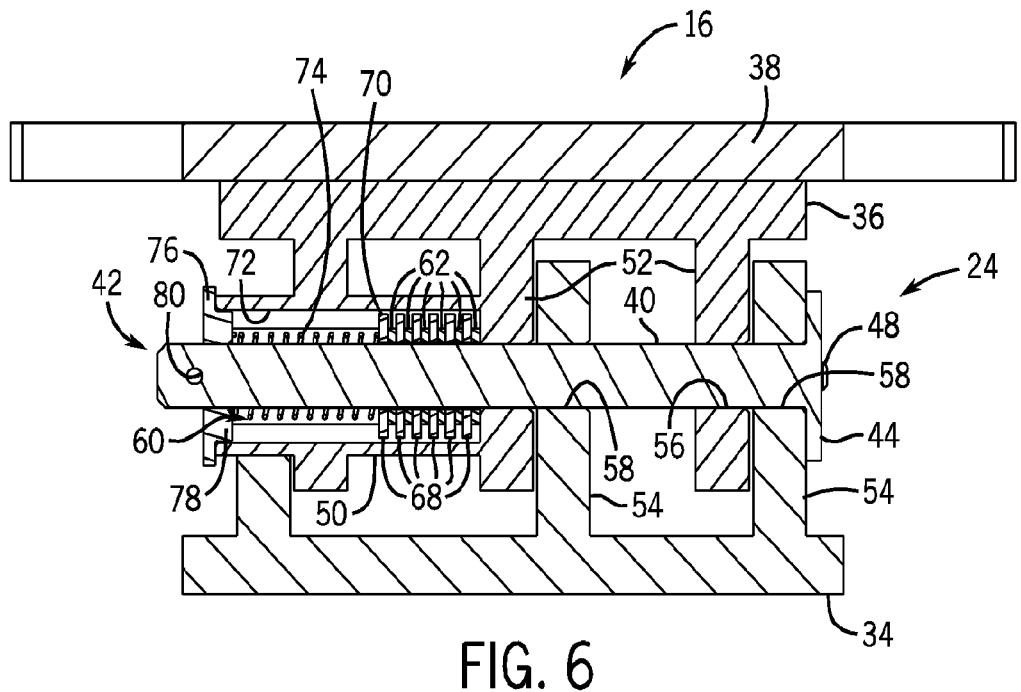
FIG. 6 is a cross-sectional view of the hinge assembly, taken along line 6-6 of FIG. 4.

FIG. 6 is a cross-sectional view of the hinge assembly 24, taken along line 6-6 of FIG. 4. As illustrated, the shaft 40 of the pin 42 passes through the openings 56 and 58 of the supports 52 and 54, thereby securing the armrest base 34 to the armrest lid 36, while facilitating rotation of the lid 36 relative to the base 34. In addition, the shaft 40 passes through the cavity 50 which contains friction disks 62 and 68 configured to increase rotational resistance of the armrest lid 36 about the shaft 40. As illustrated, protrusions 70 of the second friction disks 68 engage the recesses 72 of the cavity 50, thereby rotationally coupling the second friction disks 68 to the armrest lid 36. As discussed in detail below, the end cap 76 is also rotationally coupled to the armrest lid 36. Consequently, because the spring 74 is disposed against the end cap 76 and a second friction disk 68, the spring 74 will rotate with the armrest lid 36 without twisting.

In the present embodiment, the hinge assembly 24 includes six first friction disks 62 and six second friction disks 68, arranged in an alternating pattern along the shaft 40. As previously discussed, the number of friction disks 62 and 68 may be particularly selected to achieve a desired magnitude of rotational resistance. Specifically, more friction disks 62 and 68 will result in a greater friction force that increases rotational resistance of the armrest lid 36. For example, certain embodiments may include 1, 2, 3, 4, 5, 6, 7, 8, 9, 10, or more first friction disks 62 and a corresponding number of second friction disks 68.

In the present embodiment, the end cap 76 includes a protrusion 78 disposed within the interior 60 of the cavity 50. As illustrated, the protrusion 78 extends into the recesses 72, thereby blocking rotation of the end cap 76 relative to the armrest lid 36 via contact between the protrusion 78 and the recesses 72. In addition, the shaft 40 includes an opening 80 configured to receive a pin. The pin may serve to hold the end cap 76 against the cavity 50 despite the outward force applied by the spring 74. Furthermore, the pin may serve to block axial movement of the pin 42, thereby holding the pin 42 within the hinge assembly 24. In certain configurations, the pin may be removable such that components within the hinge assembly 24 may be replaced to alter the rotational resistance of the armrest lid 36.

Figure 7:
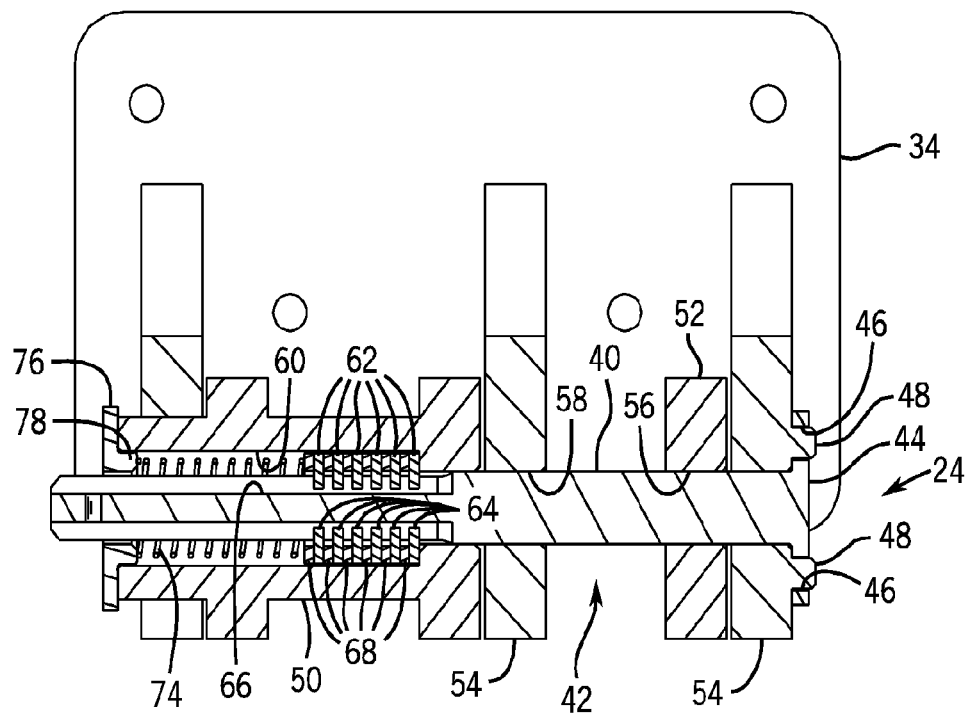
FIG. 7 is a cross-sectional view of the hinge assembly, taken along line 7-7 of FIG. 4.

FIG. 7 is a cross-sectional view of the hinge assembly 24, taken along line 7-7 of FIG. 4. As illustrated, the protrusions 48 are disposed within the openings 46 of the head 44 of the pin 42, thereby rotationally coupling the pin 42 to the armrest base 34. In addition, the inner protrusions 64 of the first friction disks 62 are disposed within the recesses 66 of the shaft 40, thereby rotationally coupling the first friction disks 62 to the pin 42. As a result, the first friction disks 62 are rotationally coupled to the armrest base 34. Because the second friction disks 68 are rotationally coupled to the armrest lid 36, rotation of the armrest lid 36 is resisted by friction between the friction disks 62 and 68. Consequently, the armrest 22 may remain in a desired position despite vehicle vibrations. Furthermore, because the pin 42 and friction disks 62 and 68 are constructed from light-weight plastic, the hinge assembly 24 may be lighter and less expensive to produce than hinge assemblies employing steel shafts and spring clips.

Figure 8:
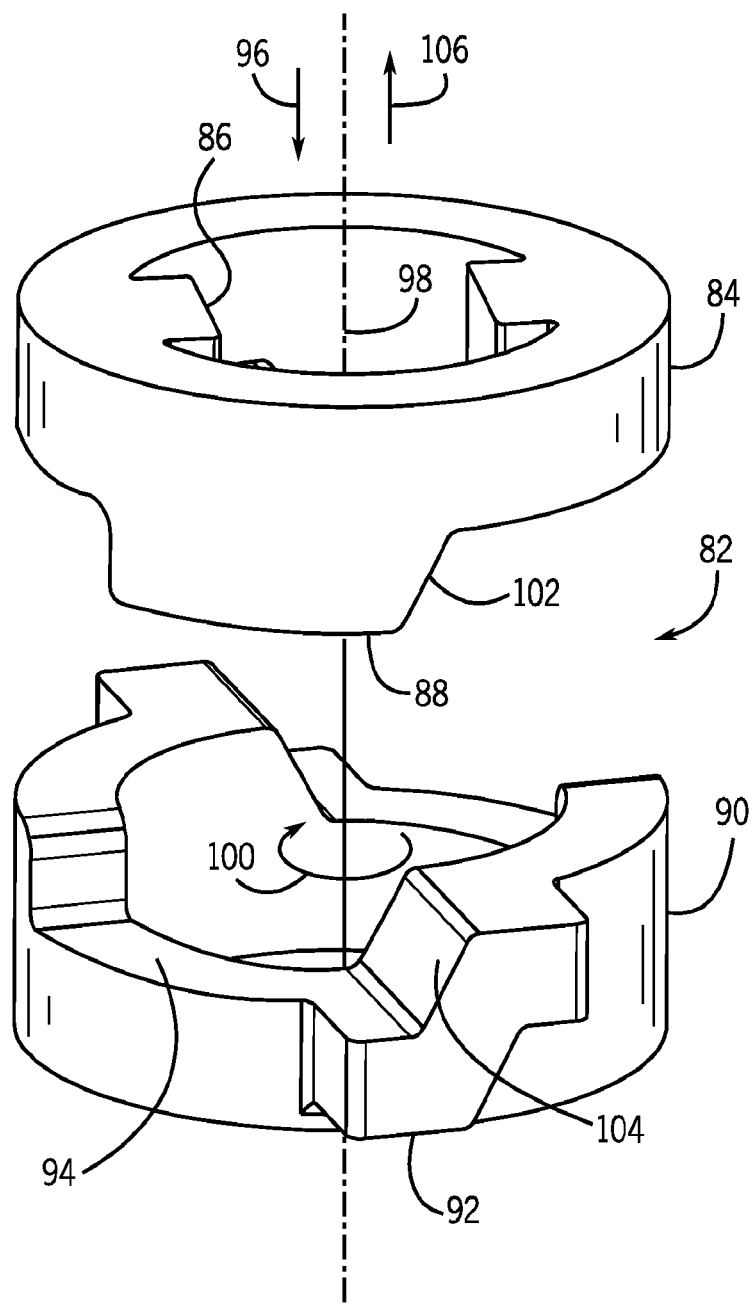
FIG. 8 is an exploded view of an embodiment of a detent assembly that may be employed within the hinge assembly of FIG. 4.

FIG. 8 is an exploded view of an embodiment of a detent assembly 82 that may be employed within the hinge assembly of FIG. 4. In the illustrated embodiment, the detent assembly 82 includes a first detent disk 84 configured to rotationally couple to the shaft. Similar to the first friction disk 62, the first detent disk 84 includes two inner protrusions 64 configured to engage two corresponding recesses 66 within the shaft 40, thereby blocking rotation of the disk 84 relative to the shaft. The first detent disk 84 also includes a first detent feature, such as the illustrated axial protrusion 88. In addition, the detent assembly 82 includes a second detent disk 90 rotationally coupled to the passage 60. Similar to the second friction disk 68, the second detent disk 90 includes two outer protrusions 92 configured to engage two corresponding recesses 72 within the passage 60, thereby blocking rotation of the disk 90 relative to the armrest lid 36. The second detent disk 90 also includes a second detent feature, such as the illustrated axial recess 94. As discussed in detail below, contact between the first detent feature 88 and the second detent feature 94 urges the armrest into a detent position.

In certain embodiments, the detent assembly 82 is disposed about the shaft adjacent to the friction disks. In such embodiments, the force applied by the spring 74 urges the first detent disk 84 against the second detent disk 90. As illustrated, the first detent disk 84 is driven in a direction 96 along an axis 98 extending through the disks 84 and 90. Consequently, when the axial protrusion 88 is aligned with the axial recess 94, the protrusion will be driven into the recess. As a result, a torque applied to the second detent disk 90 in a direction 100 will be resisted by contact between a first angled surface 102 of the axial protrusion 88 and a second angled surface 104 of the axial recess 94. Therefore, while the axial protrusion 88 is disposed within the axial recess 94, the armrest will be in a detent position. However, as the torque increases, the second angled surface 104 will drive the first angled surface 102 in a direction 106, thereby rotating the second detent disk 90 in the direction 100. While the surfaces 102 and 104 are in contact, the spring force will continue to urge the second detent disk 90 toward the detention position.

By way of example, the detent assembly 82 may be configured to establish a detent position corresponding to a horizontal orientation of the armrest. In such a configuration, while the armrest is in a horizontal orientation, the axial protrusion 88 will be engaged with the axial recess 94. Rotation of the armrest in an upward direction will be resisted by contact between the first angled surface 102 and the second angled surface 104. However, when a sufficient torque is applied, the first detent disk 84 will be driven in the direction 106, thereby facilitating rotation of the armrest. While the first angled surface 102 is in contact with the second angled surface 104, the armrest will be biased toward the horizontal orientation. However, once the surfaces no longer contact one another, the armrest will rotate freely. It should be appreciated that alternative embodiments may include multiple detent assemblies, establishing multiple detent positions. In addition, a single detent assembly may include multiple protrusions/recesses to provide the armrest with multiple detention positions.

Figure 9:
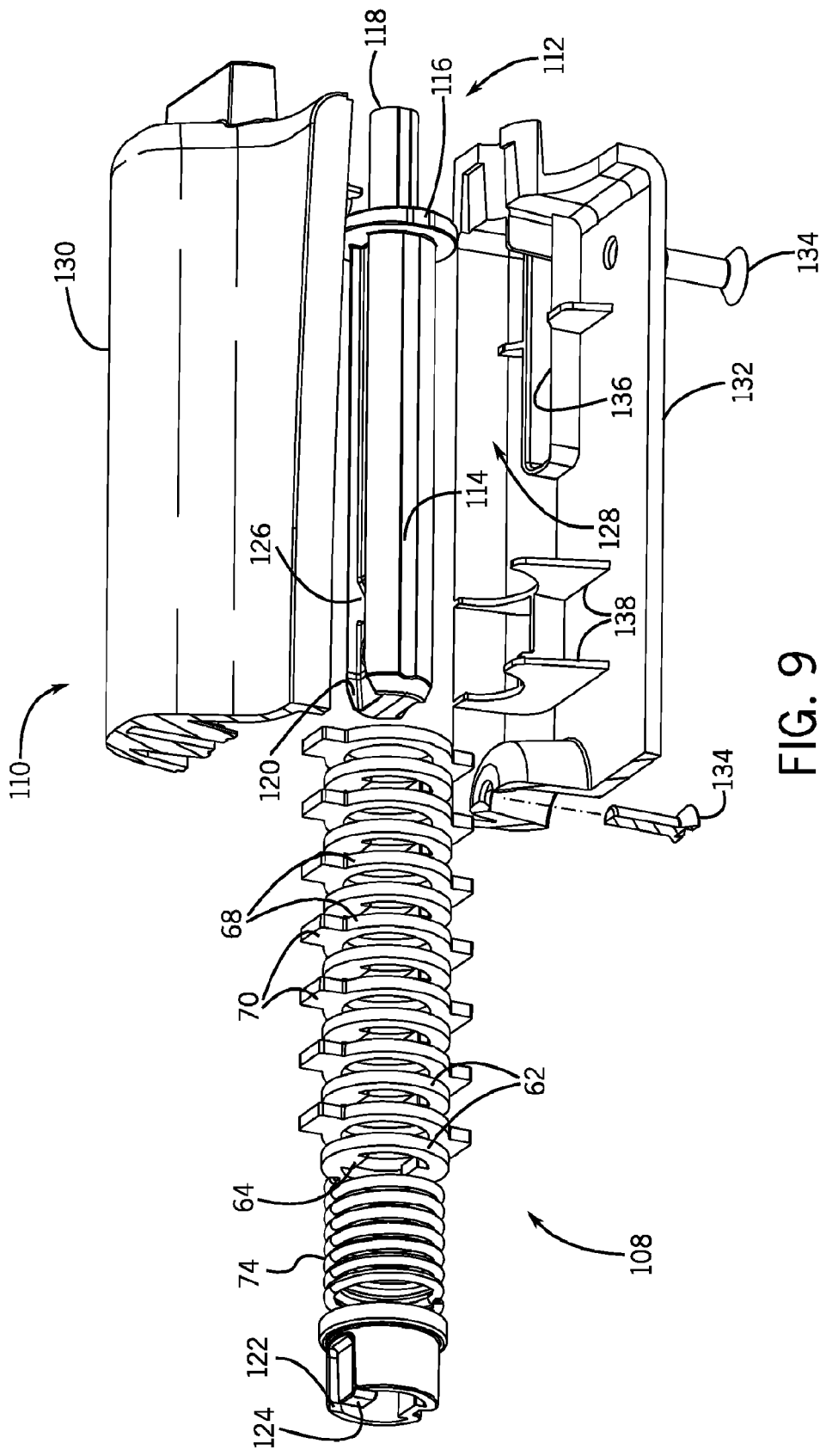
FIG. 9 is an exploded view of an embodiment of a hinge assembly having a torsion assembly configured to provide rotational resistance.

FIG. 9 is an exploded view of an embodiment of a hinge assembly having a torsion assembly 108 configured to provide rotational resistance. In the illustrated embodiment, the torsion assembly 108 is disposed within a two-part housing 110 that may be coupled to an armrest lid, for example. The torsion assembly 108 includes a pin 112 having a shaft 114 and an integrated disk 116. As discussed in detail below, the integrated disk 116 is configured to block axial movement of the first and second friction disks. In certain embodiments, an end 118 of the pin 112 may include an engagement feature configured to rotationally secure the shaft to a base, such as the armrest base 34.

As illustrated, the torsion assembly 108 includes multiple first friction disks 62, and multiple second friction disks 68 arranged in an alternating pattern. As previously discussed, the first friction disks 62 include inner protrusions 64 configured to engage a recess 120 within the shaft 114, and the second friction disks 68 include outer protrusions 70 configured to engage a recess within an outer structure. In the illustrated embodiment, the torsion assembly 108 is formed by disposing the friction disks 62 and 68 about the shaft 114, disposing the spring 74 about the shaft adjacent to the disks, and then securing the spring and disks to the shaft with an end cap 122. As illustrated, the end cap 122 includes a radial protrusion 124 configured to engage a recess 126 within the shaft 114. As discussed in detail below, contact between the protrusion 124 and the recess 126 blocks movement of the end cap 122, thereby enabling the spring to compress the disks.

Once the torsion assembly 108 is formed, the assembly may be disposed within a passage 128 of the two-part housing 110. As illustrated, the two part housing 110 includes a first portion 130 and a second portion 132, secured to one another by fasteners 134. In the illustrated embodiment, both the first portion 130 and the second portion 132 include recesses 136 configured to receive the outer protrusions 70 of the second friction disks 68. The first and second portions 130 and 132 also include guides 138 configured to support the shaft 114 during operation of the hinge assembly. In certain embodiments, the hinge assembly may be manufactured by forming the torsion assembly 108, and then disposing the torsion assembly 108 within the passage 128 of the first portion 130 such that the outer protrusions 70 of the second friction disks 68 engage the recess 136. The second portion 132 may then be secured to the first portion 130, thereby capturing the torsion assembly. The duration associated with this manufacturing process may be significantly less than processes involving positioning friction disks onto a shaft that is disposed within a cavity.

Figure 10:
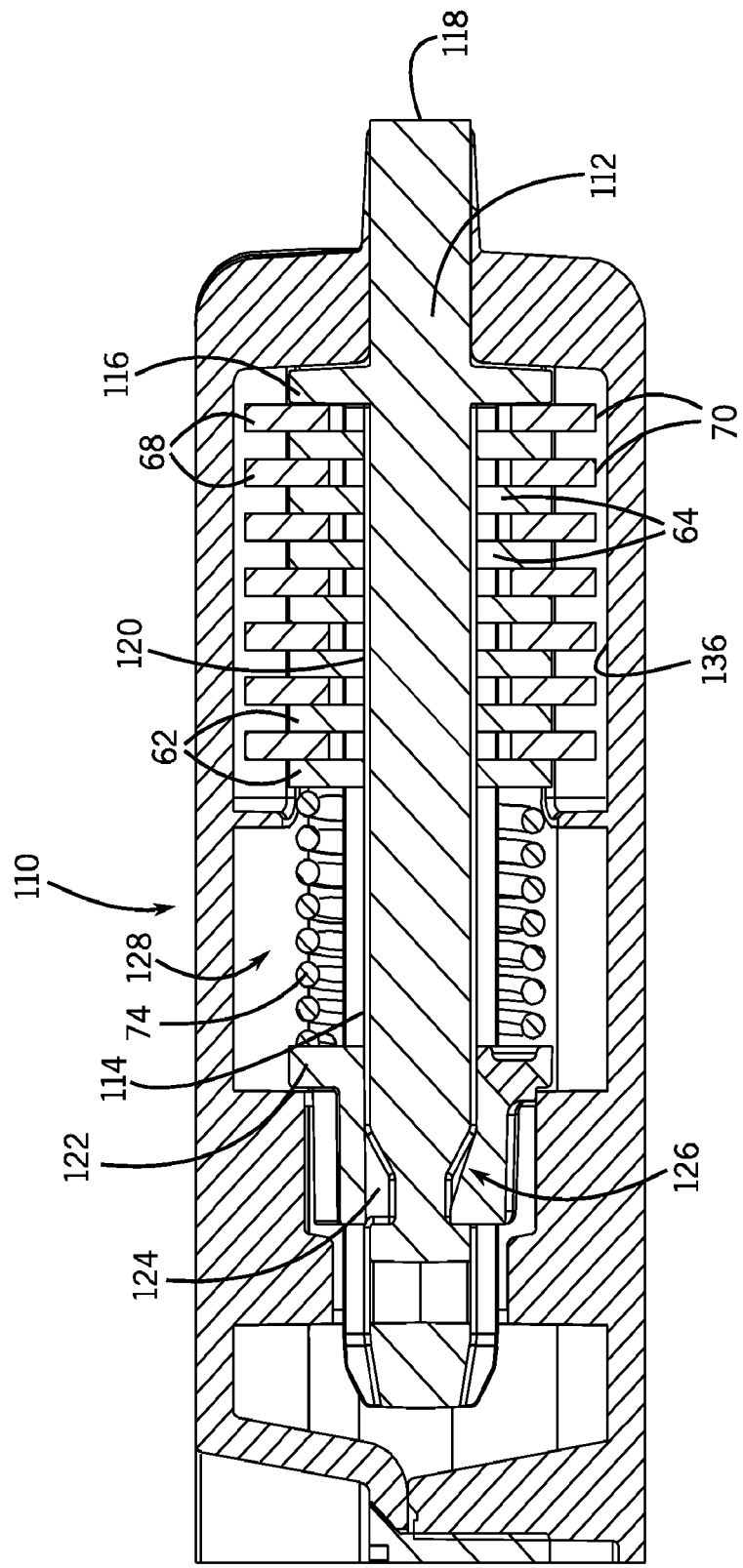
FIG. 10 is a cross-sectional view of the hinge assembly, as shown in FIG. 9.

FIG. 10 is a cross-sectional view of the hinge assembly, as shown in FIG. 9. As illustrated, the spring 74 compresses the friction disks 62 and 64 between the integrated disk 116 and the end cap 122, thereby establishing the friction force that provides resistance to armrest rotation. In the illustrated embodiment, the radial protrusion 124 of the end cap 122 includes an angled surface that facilitates movement of the end cap 122 toward the integrated disk 116, but blocks movement away from the disk 116. Consequently, during assembly, the end cap 122 may be driven toward the integrated disk 116, thereby compressing the spring 74. Once the radial protrusion 124 is aligned with the recess 126, the end cap 122 will be secured to the shaft 114, thereby forming the torsion assembly 108.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle interior trim component hinge assembly, comprising:
   a shaft non-rotatably coupled to a first structure of a vehicle;
   a second structure;
   the second structure having two parts defining a passage within the second structure, wherein the shaft passes through the passage to facilitate rotation of the second structure relative to the first structure;
   at least one first friction disk disposed about the shaft and comprising a first engagement feature configured to engage the shaft to block rotation of the at least one first friction disk relative to the shaft;
   at least one second friction disk rotatably disposed about the shaft and comprising a second engagement feature configured to engage the second structure to block rotation of the at least one second friction disk relative to the second structure;
   a biasing member configured to urge the at least one first and at least one second friction disks toward one another to establish a friction force that provides rotational resistance between the first and second structures; and
   an end cap fixedly coupled to the shaft and comprising a radial protrusion configured to engage an indentation within the shaft to secure the end cap to the shaft, wherein the biasing member is disposed between the end cap and the at least one first friction disk or between the end cap and the at least one second friction disk.

2. The vehicle interior trim component hinge assembly of claim 1, comprising a pin having the shaft and a head keyed to the first structure.

3. The vehicle interior trim component hinge assembly of claim 1, wherein the shaft comprises a recess, and the first engagement feature comprises an inner protrusion configured to engage the recess to block rotation of the at least one first friction disk relative to the shaft.

4. The vehicle interior trim component hinge assembly of claim 1, wherein the second structure comprises a recess within the passage, and the second engagement feature comprises an outer protrusion configured to engage the recess to block rotation of the at least one second friction disk relative to the second structure.

5. The vehicle interior trim component hinge assembly of claim 1, wherein the at least one first friction disk comprises a plurality of first friction disks, and the at least one second friction disk comprises a plurality of second friction disks, and the first and second friction disks alternate along the shaft.

6. The vehicle interior trim component hinge assembly of claim 1, wherein the biasing member comprises a coil spring disposed about the shaft.

7. The vehicle interior trim component hinge assembly of claim 6, wherein the end cap is configured to retain the coil spring.

8. The vehicle interior trim component hinge assembly of claim 1, comprising a detent assembly configured to hold the second structure in a detent position relative to the first structure, wherein the detent assembly comprises:
   a first detent disk non-rotatably coupled to the shaft and comprising a first detent feature;
   a second detent disk non-rotatably coupled to the second structure and comprising a second detent feature, wherein contact between the first detent feature and the second detent feature urges the second structure into the detent position.

9. A vehicle interior trim component hinge assembly, comprising:
   a two part rotatable component comprising a passage;
   a shaft adapted to be fixed to a base of a vehicle disposed through the passage of the rotatable component and rotatably coupled to the rotatable component;
   at least one first friction disk rotatably coupled to the shaft and comprising an outer protrusion configured to engage a first recess in the rotatable component to block rotation of the at least one first friction disk relative to the rotatable component;
   at least one second friction disk rotatably coupled to the rotatable component and disposed about the shaft, wherein the at least one second friction disk comprises an inner protrusion configured to engage a second recess in the shaft to block rotation of the at least one second friction disk relative to the shaft;
   a biasing member configured to urge the at least one first and at least one second friction disks toward one another to establish a friction force that provides resistance to rotation of the rotatable component about the shaft; and
   an end cap comprising an opening configured to receive the shaft and a radial protrusion configured to engage an indentation in the shaft fixedly securing the end cap to the shaft, wherein the end cap is configured to support the shaft within the passage and to secure the shaft to the rotatable component, and the biasing member is disposed between the end cap and the at least one first friction disk or between the end cap and the at least one second friction disk.

10. The vehicle interior trim component hinge assembly of claim 9, wherein the at least one first friction disk comprises a plurality of first friction disks, and the at least one second friction disk comprises a plurality of second friction disks, and the first and second friction disks alternate along the shaft.

11. The vehicle interior trim component hinge assembly of claim 9, wherein the end cap is configured to retain the at least one first and at least one second friction disks.

12. The vehicle interior trim component hinge assembly of claim 9, wherein the rotatable component comprises an armrest.

13. A method of manufacturing a vehicle interior trim component hinge assembly, comprising:
   forming a torsion assembly by non-rotatably coupling a first friction disk to a shaft adapted to be fixed to a base of a vehicle, disposing a second friction disk rotatably about the shaft adjacent to the first friction disk, and biasing the first and second friction disks toward one another to establish a friction force, wherein biasing the first and second friction disks toward one another comprises disposing a coil spring about the shaft and retaining the coil spring with an end cap;
   disposing the torsion assembly within a passage defined by a two part rotatable component such that an outer protrusion of the second friction disk engages a first recess of the rotatable component to non-rotatably couple the second friction disk to the rotatable component, wherein the friction force provides resistance to rotation of the rotatable component about the shaft; and
   providing the end cap comprising an opening configured to receive the shaft and a radial protrusion configured to engage an indentation in the shaft fixedly securing the end cap to the shaft, wherein the end cap is configured to support the shaft within the passage and to secure the shaft to the rotatable component, and the biasing member is disposed between the end cap and the first friction disk or between the end cap and the second friction disk.

14. The method of claim 13, wherein non-rotatably coupling the first friction disk to the shaft comprises engaging an inner protrusion of the first friction disk with a second recess of the shaft.

15. The method of claim 13, comprising non-rotatably coupling the shaft to the base to facilitate rotation of the rotatable component relative to the base.

* * * * *